United States Patent [19]
Kusina

[11] Patent Number: 5,479,733
[45] Date of Patent: Jan. 2, 1996

[54] DISPLAY APPARATUS

[75] Inventor: Yuri Kusina, Glendale, Calif.

[73] Assignee: Color Arts, Inc., Racine, Wis.

[21] Appl. No.: 143,629

[22] Filed: Nov. 1, 1993

[51] Int. Cl.⁶ ........................................ G09F 1/12
[52] U.S. Cl. ........................ 40/155; 40/152.1; 403/403; 52/656.9; 52/726.1
[58] Field of Search ................... 40/152, 152.1, 40/155, 611; 403/231, 402, 403; 52/656.9, 726.1, 726.2, 726.3

[56] References Cited

U.S. PATENT DOCUMENTS

| | | |
|---|---|---|
| 3,739,508 | 6/1973 | Lyles . |
| 3,901,612 | 8/1975 | Canin ............................. 52/656.9 X |
| 4,026,084 | 5/1977 | Goose ............................. 52/656.9 X |
| 4,205,470 | 6/1980 | Kapnek ............................ 40/155 |
| 4,236,847 | 12/1980 | Yasuda ............................ 403/402 |
| 4,237,636 | 12/1980 | Matthews . |
| 5,046,791 | 9/1991 | Kooiman ......................... 312/265.1 |

FOREIGN PATENT DOCUMENTS 2562173  10/1985  France ............................... 403/231

OTHER PUBLICATIONS

Pertinent pages from Catalog of 80/20 Inc., a company in Ft. Wayne, Ind.

Primary Examiner—Brian K. Green
Attorney, Agent, or Firm—Jansson & Shupe, Ltd.

[57] ABSTRACT

A frame apparatus for mounting a display panel of the type having frame members and frame connectors, the latter with fasteners. Each frame member includes a plurality of outwardly-extending arm structures and a grooved fastener-bearing surface between each adjacent pair of arm structures. The connector bears against the underside of coplanar opposed strips extending at the ends of an adjacent pair of arm structures. The connector has wing-like compression members facilitating the connection of adjoining frame members. Such connectors are configured to allow multiple joint forms and butt joints at any angle.

23 Claims, 9 Drawing Sheets

DISPLAY APPARATUS

FIELD OF THE INVENTION

This invention is related generally to signage and, more particularly, to modular display systems or devices for supporting display panels.

BACKGROUND OF THE INVENTION

Display systems of many different kinds are used for outdoor and indoor signs and advertising displays, and one common type of such display systems includes a display panel supported by a frame structure. Just a few of the almost unlimited variety of such systems are those shown in U.S. Pat. Nos. 4,237,636 (Matthews) and 3,739,508 (Lyles) and in the catalog of 80/20 Inc., a company in Ft. Wayne, Ind.

Many prior art display systems are complex in construction, lacking in sturdiness, and/or lacking in adaptability. Further, many prior systems are difficult to construct, require a very large assortment of pieces and hardware, and/or allow for little adjustment in size or shape to meet the needs of a user.

With regard to sturdiness, prior art devices, which are often made of very inexpensive materials, tend to break or develop "waviness." That is, frame components which are originally straight tend to develop undesirable curvature or bends. Additionally, over time the system begins to loosen and fall apart. Sign systems made from more expensive alloys such as aluminum and steel tend to be more complex and relatively expensive.

Additionally, some prior art systems include parts which are painted or otherwise permanently coated with appropriate colorant to coordinate with the chosen panel graphics and enhance overall aesthetic appearance. Such an arrangement allows for no modification without recoating or recoloring at great expense. Additionally, such painted or coated members tend to show wear and nicks relatively easily, particularly if the paint or other coating is only a thin layer applied to the surface of the sign system parts.

Clearly, an improved sign system which exhibits increased versatility and adaptability, greater strength, better ease of use, and/or lesser cost would be an important advance in the art.

OBJECTS OF THE INVENTION

It is an object of this invention to provide an improved display apparatus overcoming some of the problems and shortcomings of the prior art.

Another object of this invention is to provide an improved display apparatus which is very flexible in the ways in which it can be used.

It is another object to provide an improved display apparatus which is durable and does not break easily.

It is a further object of the invention to provide a display apparatus which has a small number of parts which may be used in various ways and which allows assembly in a variety of ways without resorting to the use of many different parts.

Another object of the invention is to provide an improved display apparatus which readily accommodates differing design features without the need for repainting.

How these and other important objects of this invention are accomplished will be apparent from the following descriptions and from the drawings.

SUMMARY OF THE INVENTION

This invention is an improvement in an apparatus for mounting a display panel. Such apparatus includes a plurality of frame members and frame connectors, the frame connectors having threaded fasteners such as set screws which engage portions of the frame members. Each frame member, in cross-section, includes a plurality of arm structures extending outwardly from a central frame axis and also includes a fastener-bearing surface between each adjacent pair of arm structures, as hereafter described.

The invention has many unique features, some of which relate to the frame member, that is, the portion of the apparatus used to form a rigid perimeter or frame. Other unique features involve the connector used to attach frame members to one another, and its relationship to the frame members. Still other unique features relate to the combination of decorative trim members which are inserted within the frame members to improve appearance. The apparatus of this invention has few parts, but such parts may be used in a number of different ways to form frames for signage and the like. Thus, the invention is a particularly versatile system for erection of displays of various types.

The features of the frame member will be summarized first. In a preferred form, the frame member, viewed along its constant cross-section, includes four arm structures rigidly arranged in an X configuration. Each such arm structure principally includes an elongate flat piece (or "arm"), the arms of the four arm structures converging together to a common center point and center structure. The center structure, which includes, between each adjacent pair of such arms, a pair of elongate parallel rails spaced closely together to provide a fastener-bearing surface. Such space forms a groove between the rails which allows proper location and bearing of fasteners.

Each arm structure has a point-like distal edge, forming one of the four corners of the frame member cross-section, and a pair of rigid strips at 90° to one another, converging together at and extending along the distal edge. In cross-section, each arm structure has a shape resembling that of the head of an arrow, and adjacent pairs of such arrows have coplanar strips spaced apart by a gap. Such gaps are much wider than the grooves between rails, mentioned above, and are sufficient to accommodate assembly operations.

The fasteners in the frame connectors bear against the rails and urge the frame connectors against the undersides of strips of an adjacent pair of arm structures to form rigid interconnections of adjacent frame members.

Each frame connector includes a strip-like center portion and a pair of wing-like compression members extending from opposite sides of the center portion at symmetrical obtuse angles, the center portion and compression members forming a unitary piece. The obtuse angles are preferably at 135° such that the compression members are parallel to the arms of adjacent arm structures. Such frame connectors are inserted between adjacent arms of the frame member—or, more precisely, between adjacent arms of each of two adjacent frame members which are being joined by such connector.

With the fasteners secured against a rail pair between two adjacent arm structures, the frame connector, or, more specifically, each compression member of such frame member, bears against the underside of a strip, as already noted.

In another aspect of the invention, each elongate rail has a substantially flat surface and the flat surfaces are coplanar. The pair of arm structures defines an angle between them and, in a highly preferred embodiment, such angle is about 90°. A plane coincident with the rail flat surfaces is substantially normal to a line or plane bisecting the angle. The groove between each pair of rails and the gap between the coplanar strips of two adjacent arm structures are in registry with each other. The plane bisecting the angle between the arm structures also bisects both the gap and the groove.

The preferred frame member, with its four arm structures at 90° to each other, can be used in any of four orientations. No time need be spent in positioning such frame member to a particular orientation. Furthermore, in joining two frame members end-to-end, anywhere from one to four connectors can be used. One connector alone provides substantial rigidity; more than one greatly increases the strength of the joint.

Aspects and features of the connector will now be summarized in greater detail. The fasteners, which as earlier noted are threaded screws (e.g., Allen-head set screws), extend through threaded holes in the center portions of the connector and protrude beyond such connector to engage the parallel rails. A variety of screws can be used, and the gap between the pair of strips spaced above the groove between rails is wide enough to permit easy access for tightening and loosening screws.

As already noted, the connectors are used to join frame members end-to-end; however, they are also (and in some cases more frequently) used to join frame members together at angles—most usually 90° angles, but at virtually any angle depending on the end angles of the abutting frame members. For 90° joints, mitered ends with 45° angles are joined together. The connectors have structure which accommodates angle joints, as now explained.

To facilitate joining two frame members end-to-end at an angle, most typically at a 90° angle, the center portion of the connector has a narrow substantially flat central region which is devoid of compression members therealong. The absence of such compression members (such absence sometimes referred to herein as "voids") in such central region allows the connector to be readily bent at such central region to form a 90° angle in the connector, or any other desired angle, so that mitered frame members can be joined together. If there were no voids in the central region, the compression members along either side of the connector would cause the connector to be so rigid that bending as described would be very difficult if not impossible.

The portion of the connector on one side of the bend is secured in the end of one of the two adjoining frame members and the portion of the connector on the other side of the bend is secured in similar fashion in the end of the other of the two adjoining frame members. A fastener in each such portion of the connector, such fasteners preferably being set screws having Allen heads, is tightened to make such mitered frame corner connection very rigid. This is a principal way of using the connector of this invention to form a frame corner of frame members which are end-to-end and mitered.

Such voids along opposite sides of the connector do more than merely facilitate bending to allow end-to-end interconnection of mitered frame members. The voids along opposite sides of the connector are made wide enough such that one portion of a bent connector (that is, the portion on one side of the bend) may be slid into the end of one frame member (that is, into the space between two arm structures of a frame member) and from there along a portion of the length of such frame member to a middle position where it can serve as one means to secure a cross-brace to the frame member. The bent connector cannot slide to a middle position unless the voids on either side of the connector are sufficient such that the bent connector can slide over the pair of strips on the ends of the two arm structures between which the connector is sliding. With this invention, the voids are sufficient to receive such strips, and allow sliding of the connector to a selected position along the frame member.

Such sliding of a bent connector along a frame member allows securement of the end of a cross-brace, which has the same cross-sectional form as the frame member itself, to the frame member at a middle position therealong. When the bent connector is at the position to be braced, the end of the cross-brace is inserted over the other portion of the bent connector, that is, the portion not received within the frame member. Such other portion is received into the space between two arm structures of the cross-brace, and when the fasteners tighten one portion of the connector to the frame member and the other portion of the connector to the cross-brace, an extremely rigid interconnection is achieved. The opposite end of the cross-brace can be secured to an opposite frame member of the frame in the same manner.

This is but one way of using the connector to secure a cross-brace to a frame. Instead of using just one bent connector to make such cross-brace connection, a pair of bent connectors can be used—one on either side of the cross-brace, each in symmetrical fashion with the other. And, as will be seen later, the connectors can be used in still another manner to secure a cross-brace to a frame.

Further description of the relationship of the preferred frame member and the connector configurations will be helpful. The arm of each arm structure of the frame member has a substantially flat surface as does each compression member. With the connector engaging a frame member, the flat surface of a compression member is parallel with and at least closely adjacent to the flat surface of an arm.

The frame members and connector have mating features which help the connector lock two frame members very securely together. The arm surface and adjoining undersurface of the strip which is adjacent to such arm surface intersect and form a V-channel into which a compression member of the connector is forced during assembly. Each frame member has eight such V-channels which are used in opposed pairs with the two compression members of a connector. The compression members have edges which fit in wedge-like fashion into such opposed V-channels. This is described further later in this application.

The arrangement described above is useful when connecting two frame members end-to-end or at an angle to one another with a mitered corner, as already described. However, these are not the only ways the connector can be used. In another aspect of the invention, the connector includes a pair of notches formed therein—one in each side thereof, each in one of the compression members. The two notches are at the same position along the length of the connector, but on opposite sides thereof.

With the arrangement involving such notches, frame members can be joined in a end-to-side fashion with the frame members at right angles to one another, without using a mitered corner and without bending the connector. An end of the connector is inserted into one frame member and the other end permitted to protrude so that a strip of a separate arm structure of the other frame member is received dovetail-fashion in each notch.

This sort of connection is facilitated by angling each pair of ends of the wing-like compression members at the connector end which is to bear against the side of a frame member. Such compression member ends are cut at symmetrical 45° angles to the long axis of the connector. When a frame member is dovetailed into the notches of a connector, each of the angled ends of the compression members, and the end of the connector, bears against a separate arm structure. This adds additional rigidity to the apparatus.

Still further forms of frame-member interconnection are made possible by preferred configurations of the connector. One example involves mitered end-to-end interconnection of frame members, as at the corner of a frame. A preferred form of the connector has elongate apertures extending through its center portion in position beside the threaded apertures for receiving set screws. Each such elongate aperture, like the threaded aperture beside it, is preferably along the center line of the center portion of the connector. In certain situations, as now described, one of such elongate apertures is used instead of the adjacent threaded aperture as part of the means to rigidly secure a portion of a connector to a frame member.

More specifically, when such connector is bent to allow interconnection of adjoining miter-ended frame members, an elongate aperture in one portion of the connector—that is, a portion on one side of the 90° bend therein—is used with a different form of fastener to secure such connector portion to one of the frame members. A threaded bolt extends freely through a hole in the center structure of the frame member near the mitered end thereof (such frame member hole being at 90° to the axis of the frame member) and through the elongate aperture of one portion of a bent connector. The bolt has a turn-engageable end (for example, a screw head) at one end thereof, such turn-engageable end positioned to be exposed at the outside edge of the frame. Secured at the other end of bolt 62 is a fixed member, such as a lock nut of the type having a plastic internal element which prevents its full and free turning on the threaded portion of a bolt. Such fixed member is in fixed position on the end of the bolt at a position on the other side of the frame member center structure, that is, the side other than that where the turn-engageable end (e.g., screw head) is located. A Tinnerman clip (or similar threaded member) is threadedly engaged on the bolt, also on such other side, and is positioned between adjacent arm structures of the frame member so that it cannot turn. For convenience, the Tinnerman clip or similar member is sometimes referred to as "trapped threaded member" because of its restrained positioning.

The location of the fixed member (e.g., lock bolt) at or near the end of the bolt is such that the threaded length of the bolt between such fixed member and the turn-engageable end (screw head) is more than the combined dimensions of the center structure of the frame member through which the bolt extends, and the thickness of the Tinnerman clip. To rigidly interconnect the frame member to this portion of the connector, the screw head or other turn-engageable member is turned in a tightening direction, using a screw driver or other tool which is applied from a position outside the frame. Loosening of such interconnection is caused by turning in the opposite direction.

The tightening of the bolt as described draws the Tinnerman clip, which is restrained from rotating, firmly against the center structure, in effect sandwiching the connector and the frame member center structure tightly together between the screw head (or other turn-engageable bolt portion) and the Tinnerman clip. Loosening causes a loosening of such sandwiching, and allows the connector to be slid in a direction along the length of the connector portion which is secured to a frame member by such bolt and Tinnerman clip arrangement. The fixed member (e.g., lock nut) is in fixed position along the bolt such that the Tinnerman clip, upon loosening, cannot be loosened enough to be backed out of its position of rotational restraint between the frame member arm structures.

This sort of connection may be referred to as an "adjustable" connection means.

This arrangement allows easy removal and replacement of display boards and the like without disassembling the frame—in fact, with hardly any frame-related work at all. If this form of easy adjustment is desired, two mitered corner connections as just described are used at adjacent corners of the frame. Each such corner connection would include one adjustable connection means as just described for one portion of a 90° bent connector, the other portion in each case being the non-adjustable arrangement earlier described. When the adjustable connection means are loosened from opposite frame portions, the frame member which is intervening (which may be secured to the other portions of connectors in the non-adjustable way) may be slid away from its normal position, thus expanding the frame to allow removal of graphics. The extent of movement is limited by the length of the elongate apertures in the connectors. When a new display sheet is inserted (to whatever display sheet groove member may be used), the intervening frame member, with its rigidly connected 90° bent connectors, is slid against the adjacent frame members, whereupon the two adjustable connection means are tightened, as earlier described.

The inventive apparatus also includes provisions for replaceably employing color or other decoration as a means of making such apparatus more aesthetically attractive and/or coordinating with sign graphic colors. A variety of double-track and single-track channel members, adapted to receive display panels, and a variety of purely decorative members may be attached to the frame members by simple snapping. Such channel members and other snap-on decorative members are preferably of extruded plastic which is homogeneously colored throughout rather than merely on the surface. To make it easy to snap a display panel into place, channel members have a slot for receiving the edge of such a panel.

Further details of the invention are set forth in the detailed description and the drawings.

DETAILED DESCRIPTION OF PREFERRED EMBODIMENTS

Figure 1:
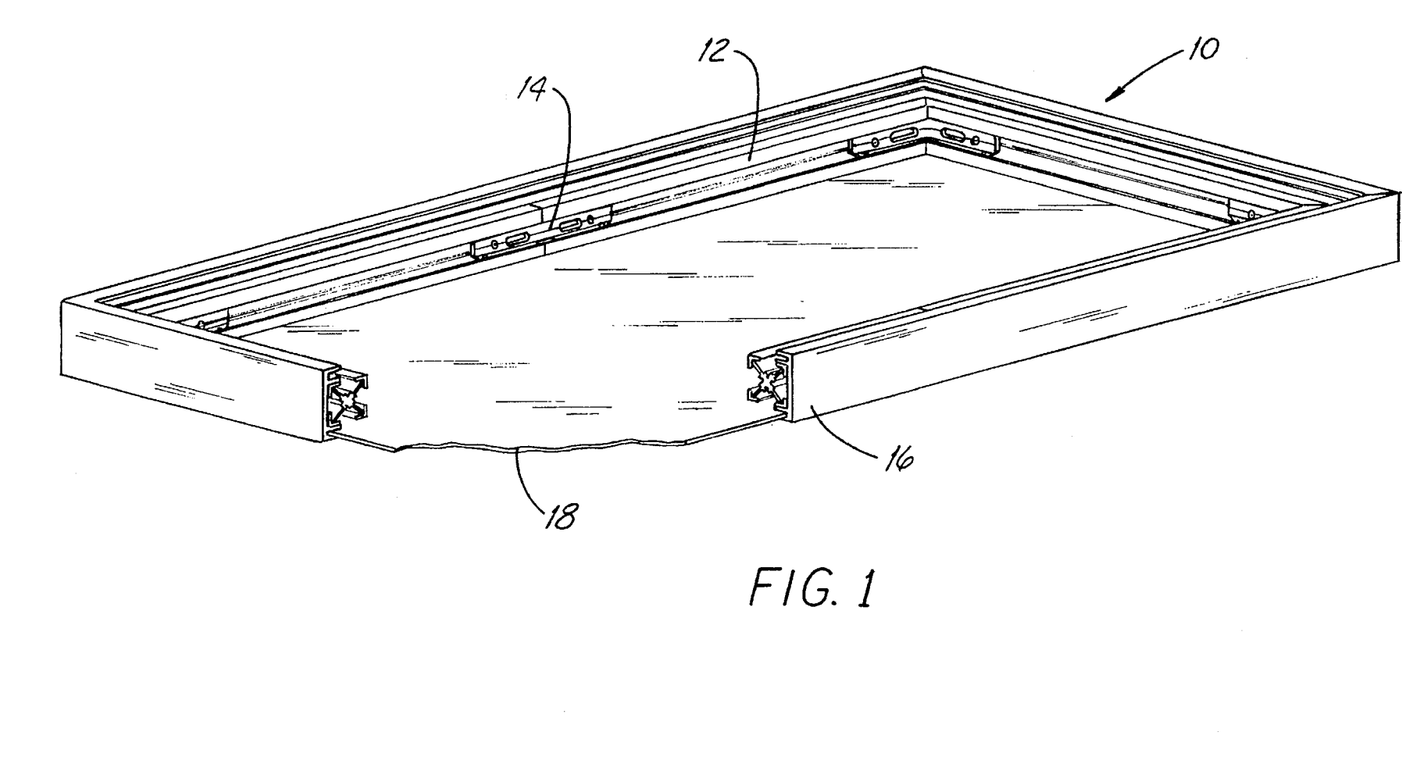
FIG. 1 is a perspective view, partially broken away, of the apparatus for mounting a display panel of the present invention.

As best seen in FIG. 1, inventive frame apparatus 10 includes, in one embodiment, a plurality of "four-arm" frame members 12, each connected to adjacent frame members 12 by a key-like frame connector 14. Frame members 12 are preferably made of extruded aluminum. A plurality of channel members 16 are disposed along the exterior sides of frame members 12. Such channel members 16, preferably made of extruded plastic, are adapted to receive a graphic display panel 18.

Figure 2:
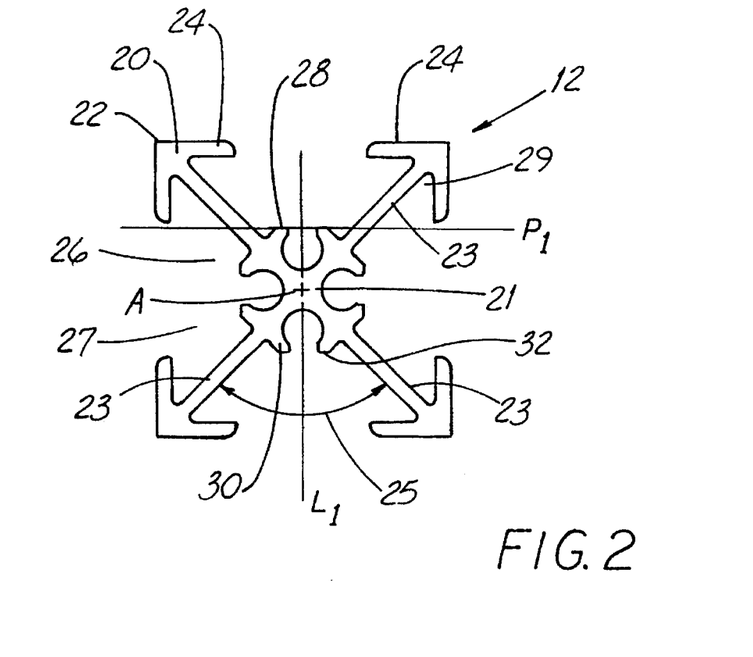
FIG. 2 is an end view of a frame member of the apparatus.

Referring also to FIG. 2, each frame member 12 includes a plurality of arm structures 20 and a center structure 21. Arm structures 20 extend outwardly from a frame axis A. Each arm structure 20 includes a distal edge 22, an arm 23 and a pair of rigid strips 24 attached to and extending laterally from arm 23. Preferably, such strips 24 are arranged perpendicular to one another.

Each strip 24 extends longitudinally along the distal edge and also extends laterally toward a strip 24 of an adjacent arm structure 20. Each pair of adjacent arm structures 20 defines an elongate, generally V-shaped cavity 26 therebetween while two strips 24, one on each of the pair of arm structures 20, define a gap 27 therebetween.

Frame member 12 also includes a fastener-bearing surface 28 disposed between each adjacent pair of arm structures 20. Such surface 28 includes a pair of spaced elongate rails 30, each of which has a substantially flat surface 32. And each flat surface 32 is coplaner with flat surface 32 of adjacent rail 30 and with plane $P_1$ further described below.

The elements of frame member 12 have certain geometric relationships. For example, each adjacent pair of arm structures 20 (more specifically, each pair of arms 23 of such adjacent arm structures 20) defines an angle therebetween which is noted at numeral 25. Most preferably, such angle is about 90°. With respect to a line $L_1$ which bisects angle 25, plane $P_1$ is substantially normal.

Each strip 24 and its supporting arm 23 also have a geometric relationship in that the undersurface of such strip 24 and the adjoining surface of arm 23 define a V-channel 29 extending along the length of frame member 12. Each arm structure 20 has two such V-channels 29 at its end. As described below, edges of connector 14 are urged into such V-channel 29 in wedging fashion when frame members 12 are coupled together by connector 14.

Each pair of rails 30 has a groove 34 disposed therebetween. Groove 34 is in registry with gap 27. Line $L_1$ bisects gap 27 and groove 34. The width of gap 27 is substantially greater than the width of groove 34. Each arm structure 20 is disposed at a 45° angle with respect to line $L_1$.

Figure 4:
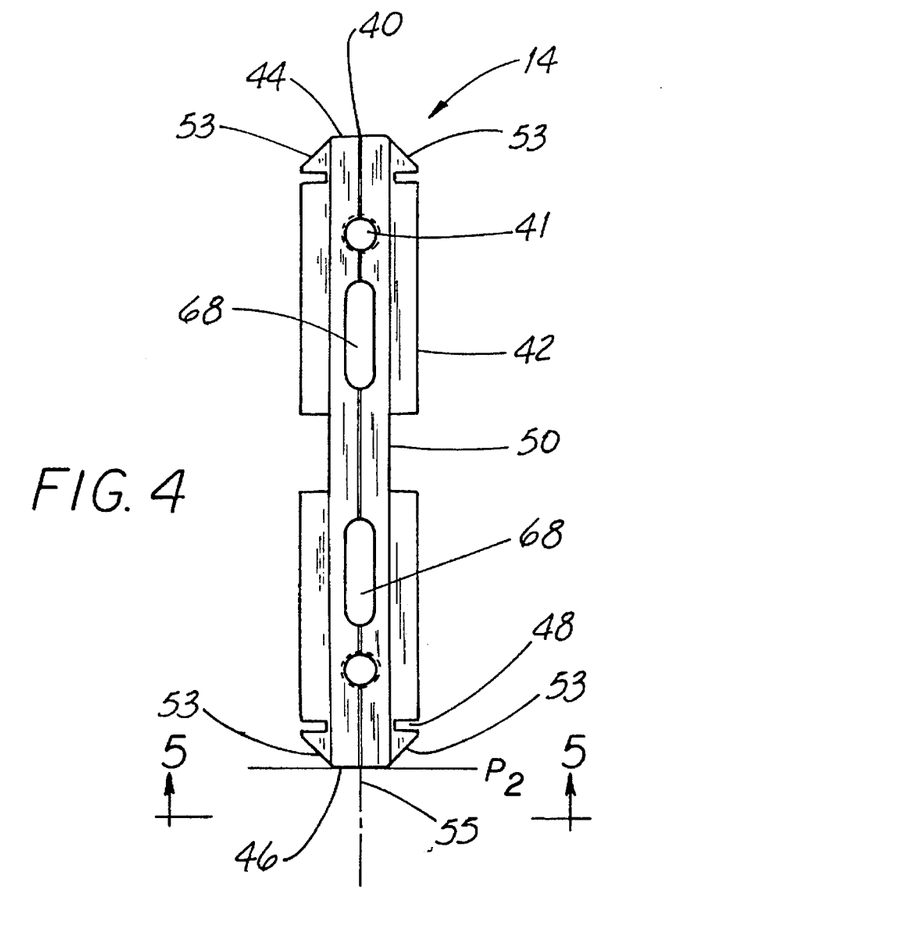
FIG. 4 is a plan view of the frame connector shown in FIG. 3.

Referring additionally to FIG. 4, frame connector 14 is used wedge-like to attach frame members 12 to one another. Such connector 14 includes an elongate strip-like center portion 40 having a pair of threaded apertures 41 disposed therethrough for receiving set screws or the like. A pair of wing-like compression members 42 extend from connector center portion 40. Compression members 42 are adapted such that when frame connector 14 is inserted into cavity 26 of frame member 12 (as when connecting frame members 12 in end-to-end or "mitered corner" relationship), compression members 42 bear against each strip 24.

But that is not the only way connector 14 can be used to attach frame members 12 to one another. Connector 14 includes a first end 44 and a second end 46. A notch 48 is formed in each compression member 42 near each of the first and second ends 44 and 46. Each compression member 42 is tapered at the ends thereof and, preferably, at a 45° angle with respect to a plane $P_2$ at each end 44 and 46 of connector center portion 40. A way in which notches 48 are used to attach frame members 12 to one another is described below.

Figure 5:
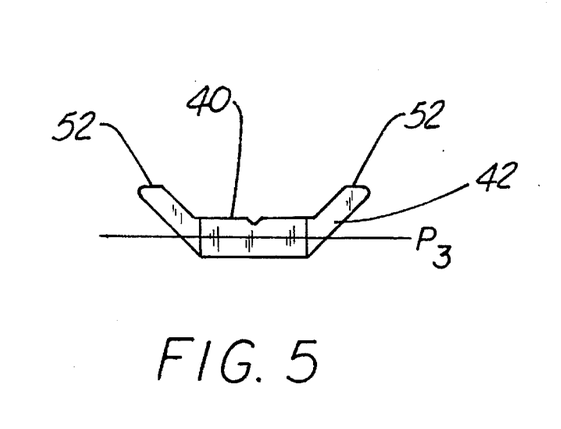
FIG. 5 is an end view of the frame connector shown in FIG. 4, taken along viewing plane 5—5 thereof.
Figures 6, 7:
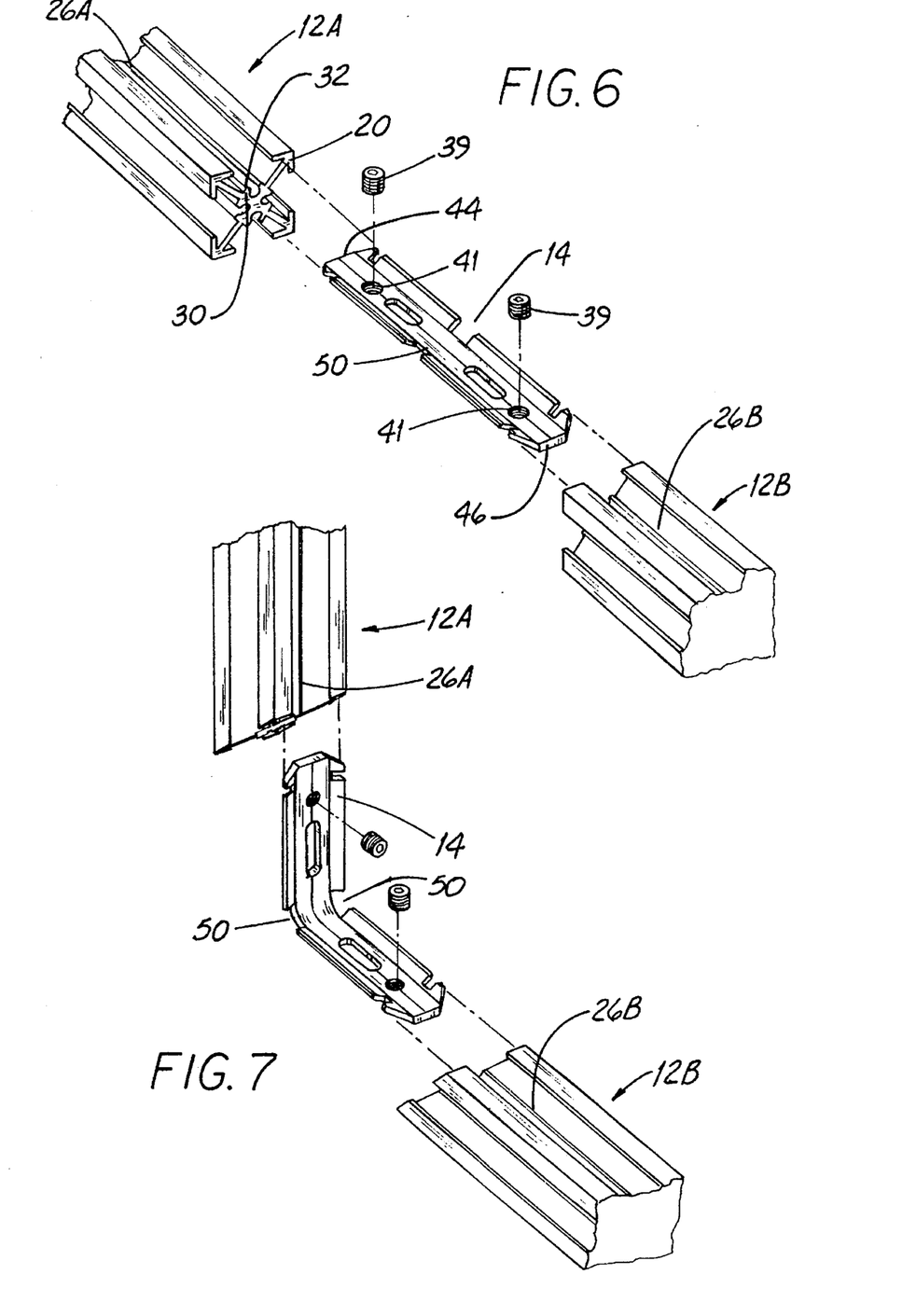
FIG. 6 is an exploded perspective view illustrating how a pair of frame members are attached end-to-end to one another by the connector shown in FIGS. 4 and 5.
FIG. 7 is an exploded perspective view illustrating how a pair of frame members are attached angular to one another (in "mitered corner" fashion) by the connector shown in FIGS. 4 and 5.

As best can be seen in FIG. 5, wing-like compression members 42 are disposed at a 45° (or 135° from the reverse side) angle with respect to a plane $P_3$ extending through connector center portion 40. Such an arrangement permits frame connector 14 to be snugly secured wedge-like within cavity 26 of a frame member 12. Frame connector 14 also includes a narrow central region 50 which is devoid of compression members 42 so that such region 50 can be readily bent to make angular miter-corner connections of frame members 12 to one another as illustrated in FIG. 7 and further described below.

A way in which connector 14 is used to make end-to-end attachment of frame members 12 will now be described. Referring also to FIG. 6, when connecting a first frame member 12A and a second frame member 12B to one another, first end 44 of connector 14 is inserted into cavity 26A of a first frame member 12A. Second end 46 is inserted into cavity 26B of a second frame member 12B and members 12A and 12B are urged toward one another so that when such members 12A and 12B abut, connector region 50 is about in registry with abutting ends of such members 12A and 12B.

A set screw 39 is inserted into each threaded aperture 41 and tightened. Upon so doing, each such set screw 39 bears against flat surfaces 32 of rails 30. Such screws 39 thus urge compression members 42 of connector 14 against the corresponding pair of arm structures 20. More particularly, edges 52 of compression members 42 of connector 14 are wedged into V-channels 29, making a very rigid connection. This interconnection is made even stronger by a slight degree of flexing across the width of connector 14, which, depending upon the extent to which screws 39 are tightened, may cause compression members 42 to spread very slightly and be even more strongly engaged with the frame member in its V-channels. A way in which connector 14 is used to make angular end-to-end interconnection of frame members 12 will now be described. Referring to FIG. 7, connector 14 is bent at its central region 50 to the desired angle. To make an attractive mitered-corner abutment joint, first frame member 12A and second frame member 12B are miter cut in a known way. An end 44 or 46 of connector 14 is inserted into a respective cavity 26A and 26B, the miter cut ends of members 12A and 12B are brought to abutment and screws 39 inserted and tightened as described above.

In this arrangement, members 12A and 12B can be at any of a wide variety of angles to one another. The illustration of FIG. 7 shows a 90° angle; the most common angle is, of course, 90° because most signs and displays are rectangular.

But these are not the only ways in which connector 14 can be used. Other ways in which connector 14 can be used will now be described, including uses to secure cross-braces between frame members 12 and uses to make end-to-end corner connections.

Central regions 50 along the opposite sides of connector 14 are sufficient in width so that they do much more than facilitate bending of connector 14 to allow the end-to-end corner interconnections just described. Central regions (or voids) 50 are made wide enough such that one portion of a bent connector (see element 14 in FIG. 7), that is, the portion on one side of the bend, may be slid into the end of a frame member 12 and from there along a portion of the length of such frame member to a middle position where it can serve as one means to secure a cross-brace to the frame member. Central regions 50 are sufficient to receive such strips 24, and allow sliding of bent connector 14 to a selected position along frame member 12.

Figure 15:
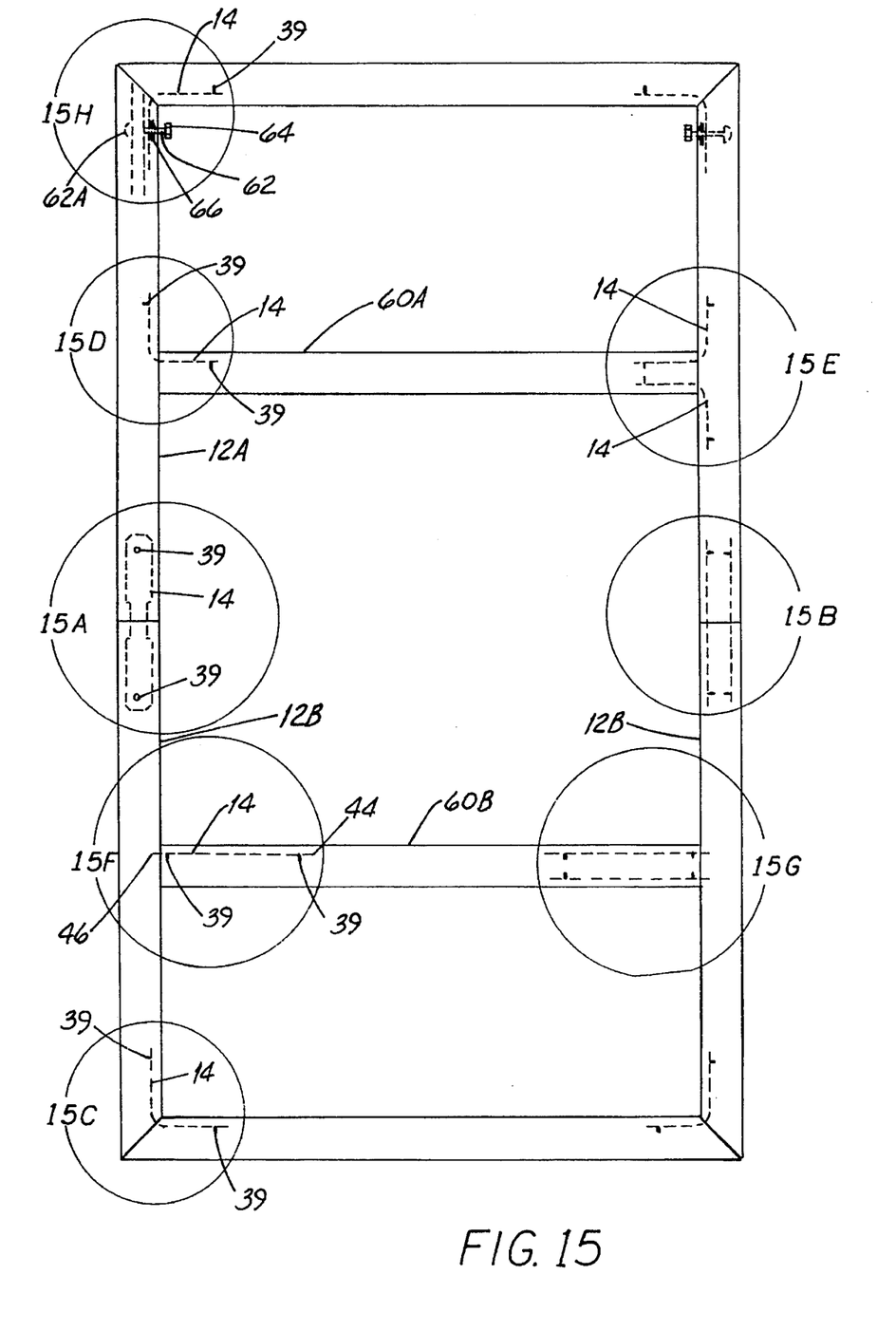
FIG. 15, with highlighted portions 15A–15H, is a schematic view of a frame and cross-braces, illustrating various forms of interconnection of the apparatus of this invention.

Portion 15D of FIG. 15 shows a bent connector 14 which has been slid to a middle position along frame member 12A and rigidly affixed thereto by tightening of set screw 39. Bent connector 14 is shown in a schematic edge view. Bent connector 14 in portion 15D of FIG. 15 is used to secure an end of cross-brace 60A, which has the same cross-sectional form as frame member 12 (12A in FIG. 15), against a side of frame member 12A. As the entire frame is brought together, or earlier when cross-brace 60A is first brought into engagement with frame member 12A, the end of cross-brace 60A is inserted over the portion of bent connector 14 which is not received within frame member 12A. When such other portion of bent connector 14 is received into the space between two arm structures of cross-brace 60A, the set screw 39 in such portion of connector 14 is tightened to form an extremely rigid interconnection of frame member 12A and cross-brace 60A.

Portion 15E of FIG. 15 illustrates a variation of the cross-brace connection shown in portion 15D of FIG. 15. This variation involves sliding a pair of bent connectors 14 in symmetrical fashion to middle positions along the frame member 12B, as shown in portion 15E of FIG. 15. (Once again, in portion 15E of FIG. 15, bent connectors 14 are shown in schematic edge view.) This arrangement provides an even sturdier attachment of cross-brace 60 to the frame member.

Figure 3:
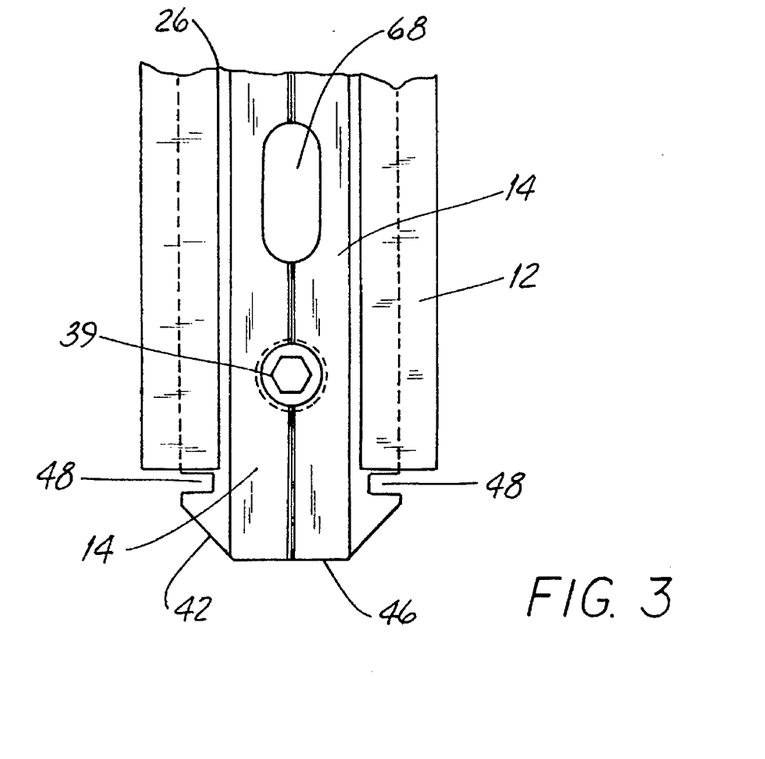
FIG. 3 is a plan view of a frame connector inserted into a frame member of the apparatus. Parts are broken away.

Connectors 14 can be used in still another manner to secure a cross-brace to a frame. FIGS. 2 and 3 and portions 15F and 15G of FIG. 15 illustrate such other way, which utilize the aforementioned pair of notches 48 near each of the ends of connectors 14, as shown best in FIG. 3. Notches 48 are dimensioned both in width and in depth to receive a pair of strips 24 (see FIG. 2) of adjacent frame member arm structures 20. In portions 15F and 15G of FIG. 15, straight connectors 14 are shown by schematic edge views thereof.

As illustrated best in portion 15F of FIG. 15, if one end 44 of a straight (unbent) connector 14 is inserted into a cavity of a cross-brace 60B, which is of the same cross-section as frame member 12 (as shown in FIG. 3), opposite end 46 of such connector 14 can be permitted to protrude to expose notches 48 (see FIG. 3). Strips 24 of frame member 12B of FIG. 15, which is like that shown in FIG. 2, are then inserted dovetail fashion into notches 48, and connector 14 is urged as far as possible into the end of cross-brace 60B where it is secured thereto by means of the tightening of set screws 39, both of which engage cross-brace 60B.

It will be noted in FIG. 4 that each of the ends (44 and 46) of connector 14 has a pair of surfaces 53 angled to the long axis 55 of connector 14. More specifically, the angled portions of the end of connector 14 are the ends of the two opposite wing-like compression members 42 of such connector 14, and these ends are angled to be parallel to the two arms 23 of adjacent arm structures 20 of frame member 12B, and thus facilitate insertion of the protruding end of a straight connector 14 into the side of a frame member 12B.

When the cross-brace is of the same cross-sectional configuration as the frame members (that is, like that of FIG. 2), securement of such cross-brace in the manner illustrated schematically in portion 15F of FIG. 15 is particularly easy and fast. Cross-brace 60B, with straight connector 14 secured straight within it, may be inserted between frame members with considerable ease, and yet provide significant extra strength to the frame.

Portion 15G of FIG. 15 illustrates a variation of the arrangement shown in portion 15F of FIG. 15. In this variation, a pair of straight connectors 14 are used on opposite sides of cross-brace 60B, with each being connected identically to the manner of connection shown in portion 15F of FIG. 15.

Figure 14:
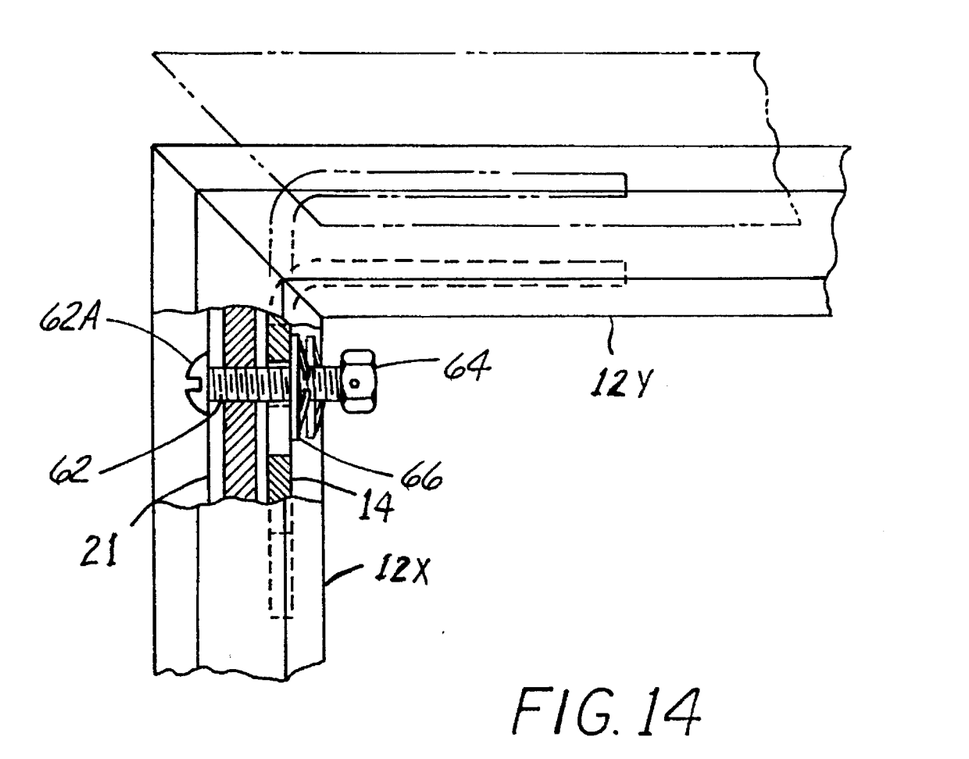
FIG. 14 is a partially cutaway view illustrating an alternative form of corner joint, such corner adjusted to two different positions—one shown in full lines and the other in phantom lines.

FIG. 14 and portion 15H of FIG. 15 illustrate another way to use connector 14 for mitered end-to-end interconnection of frame members, as at the corner of a frame. Such interconnection means involves elongate apertures 68 which extend through center portion 40 of connector 14. (See FIG. 4; see also FIG. 3.) Elongate apertures 68 are beside threaded apertures 41 along the center line of center portion 40 of connector 14. In some situations, as will be described, an elongate aperture 68 is used instead of its adjacent threaded aperture 41.

FIG. 14 shows, in full line, an end-to-end corner interconnection of frame members 12X and 12Y which is similar to the mitered corner interconnection earlier described except that an elongate aperture 68 is used and a fastener is used which is different than the set screws earlier mentioned and shown. FIG. 14 shows that a bolt 62 extends through a hole in center structure 21 of frame member 12X, and through elongate aperture 68 of one portion of bent connector 14. Bolt 62 has screw head 62A at one end in position to be exposed at the outside edge of a frame. Secured at the other end of bolt 62 is a lock nut which is in fixed position on the end of bolt 62 such that it cannot move along the length thereof. Threadedly engaged to bolt 62 on the other side of center structure 21 is a Tinnerman clip 66 which cannot turn even when bolt 62 is turned, because clip 66 is constrained between the arms of adjacent arm structures of frame member 12X.

To rigidly interconnect frame members 12X and 12Y, screw head 62A is turned such that Tinnerman clip 66 is drawn tightly against center structure 21, as illustrated by full lines in FIG. 14. This tightened condition is achieved in a comparable location of the adjacent corner of a frame, as shown in FIG. 15, particular attention being drawn to portion 15H of FIG. 15 and the similar adjacent corner which is not in a highlighted portion. In such condition, a display panel (not shown in FIGS. 14 or 15) is secured in slots of channel members which are in turn secured to frame members 12.

To quickly and easily remove and replace a display panel, the frame may be opened slightly simply by turning screw head 62A in the direction opposite that for tightening. Similar turning occurs with respect to the screw head of a similar interconnection on the adjacent corner of the frame; see FIG. 15. Such turning causes Tinnerman clip 66 to move away from its tight engagement on center structure 21, thus allowing frame member 12X to be loosened from its securement against the portion of connector 14 engaged with it. And, since bolt 62 extends through elongate aperture 68, frame member 12Y and connector 14 which is rigidly affixed to it may be slid away from frame member 12X, and away from the comparable frame member on the opposite side of the frame, to the position illustrated in FIG. 14 by phantom lines.

This allows quick removal and replacement of a display panel. And, thereafter, it allows quick full reassembly to the rigid fully-connected form illustrated in FIG. 15 and in full lines in FIG. 14.

FIG. 15 more clearly illustrates other forms of interconnection earlier mentioned above. For example, portion 15A of FIG. 15 shows the form end-to-end straight connection of two frame members. In such portion of FIG. 15, a straight connector 14 is secured into each of two frame members 12A and 12B using set screws 39 as earlier described. And, portion 15B, which illustrates connectors 14 in schematic edge views, shows how a pair of the connections as shown in portion 15A of FIG. 15 can be used for a single straight end-to-end interconnection of frame members. Indeed, it is also possible to use three or four straight connectors 14 in such an interconnection—for maximum strength.

Portion 15C of FIG. 15 illustrates schematically the form of corner interconnection first described above, using a 90° bent connector 14 and set screws 39 in the manner earlier described.

Other forms of frame member interconnection and frame mounting are also possible. For example, in some situations center portion 40 of a connector 14 may simply be nested into gap 27 of frame member 12, and such nesting will serve to hold connector 14 in position against frame member 12 for various purposes. In one such situation, screws may extend through connector 14, with their screw heads against center portion 40 and between the two opposite wing-like compression members 42 of such connector 14, and from there extend through holes formed in center structure 21 and on into engagement with a wall or ceiling surface or the like. Many variations are possible.

The apparatus of this invention also includes various clip-on channels and pieces for retaining a panel 18 and/or to enhance the aesthetic appearance of the signage system. A variety of extruded colored channel members might be used for such purposes.

Figure 8:
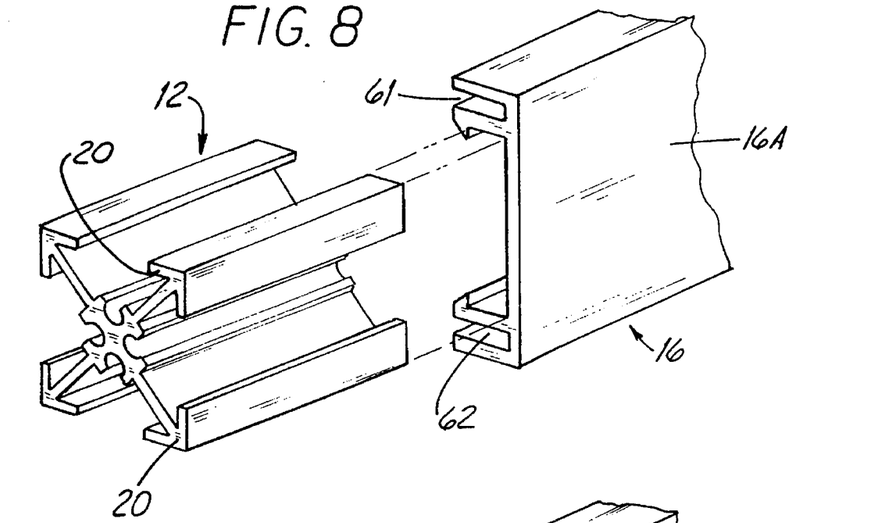
FIG. 8 is an exploded perspective view of a portion of a frame member and one type of channel member to be affixed to the frame member.
Figure 13A:
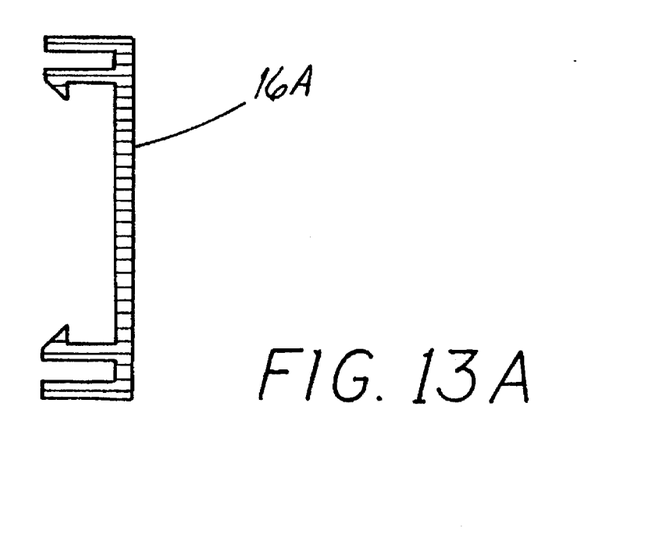
FIGS. 13A, 13B and 13C show exemplary colored channel members and colored decorative members. Color coding is for blue, red and brown, respectively.

Referring to FIGS. 1, 8 and 13A, one embodiment of one such channel member 16A slides on or snaps over and engages a strip 24 on each of two adjacent arm structures 20 of a frame member 12. Such channel 16A has a pair of oppositely disposed slots 61 and 62, one on each side of frame member 12. As shown in FIGS. 1 and 8, slot 61 or slot 62 (numerals 61 and 62 not shown in FIG. 1) receives the edge of a sheet-like display or graphics panel 18 mounted on either side of a frame apparatus in accordance with this invention. And, of course, slots 61 and 62 can both be used in order to mount two panels 18, one on each side of the frame apparatus of this invention.

Figure 9:
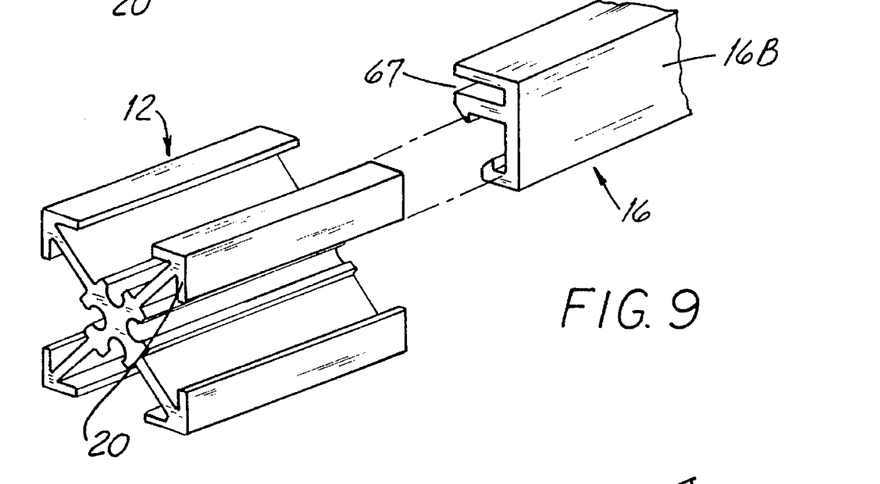
FIG. 9 is an exploded perspective view of a portion of a frame member and another type of channel member adapted to be affixed to the frame member.
Figure 13B:
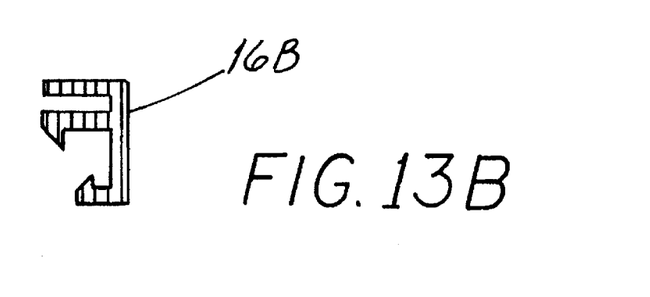
Figure 13C:
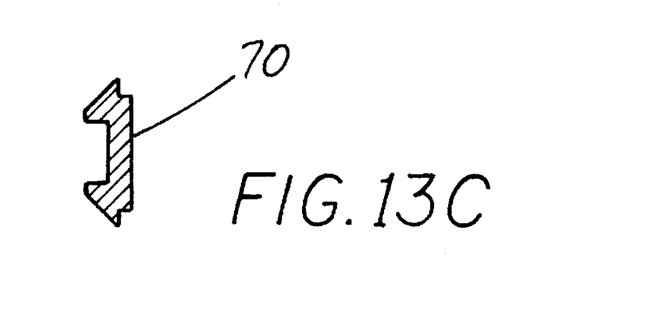

FIGS. 9 and 13B show another type of extruded colored channel member 16B, sometimes referred to as a corner channel. Such channel member 16B slides or snaps over and engages both strips 24 of a single arm structure 20. Such channel member 16B has one slot 67 for holding a panel 18.

And there is no reason why all of channel members 16A and 16B on a particular frame apparatus of this invention need be all the same color. Channel members 16A and 16B can be employed in different colors about the perimeter of the frame apparatus. Further, channel members 16B of differing color can be used on each side of the frame apparatus.

Figure 10:
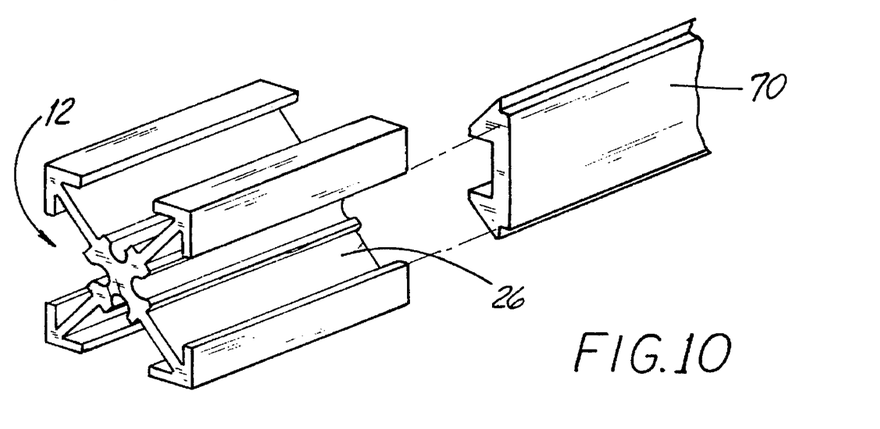
FIG. 10 is an exploded perspective view of a portion of a frame member and a decorative member to be affixed to the frame member.

FIG. 10 shows a strip-like decorative member 70 which slides on or snaps into a cavity 26. Such member 70 provides a more "finished" edge for the frame apparatus. And since, like members 16A and 16B, member 70 is preferably made of homogeneously colored extruded plastic, the color is retained even if such members 16A, 16B or 70 become scratched or nicked.

Figure 11:
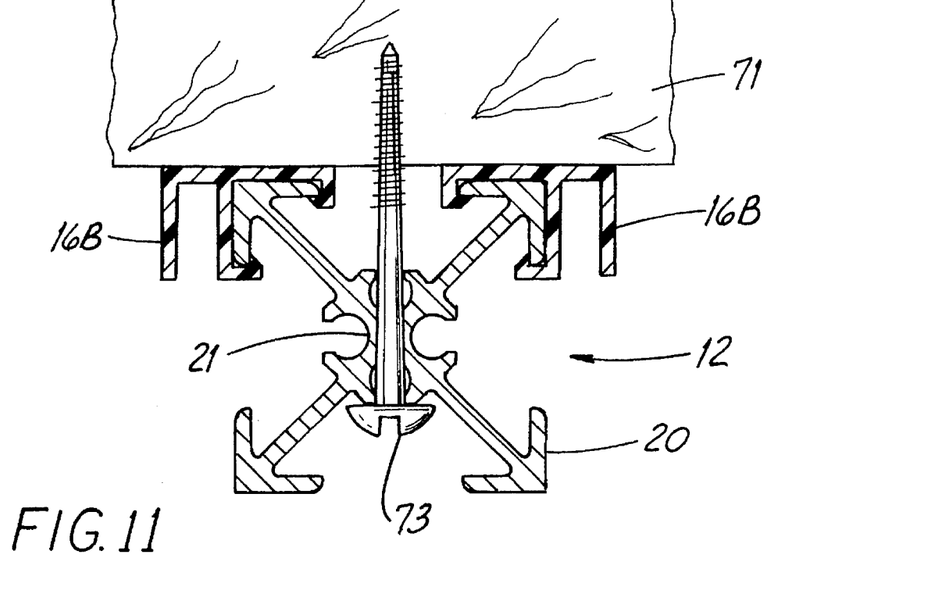
FIG. 11 is a cross-section view of a frame member and a pair of side supports attached to a surface such as a wall, ceiling or drop-ceiling T-bar support.
Figure 12:
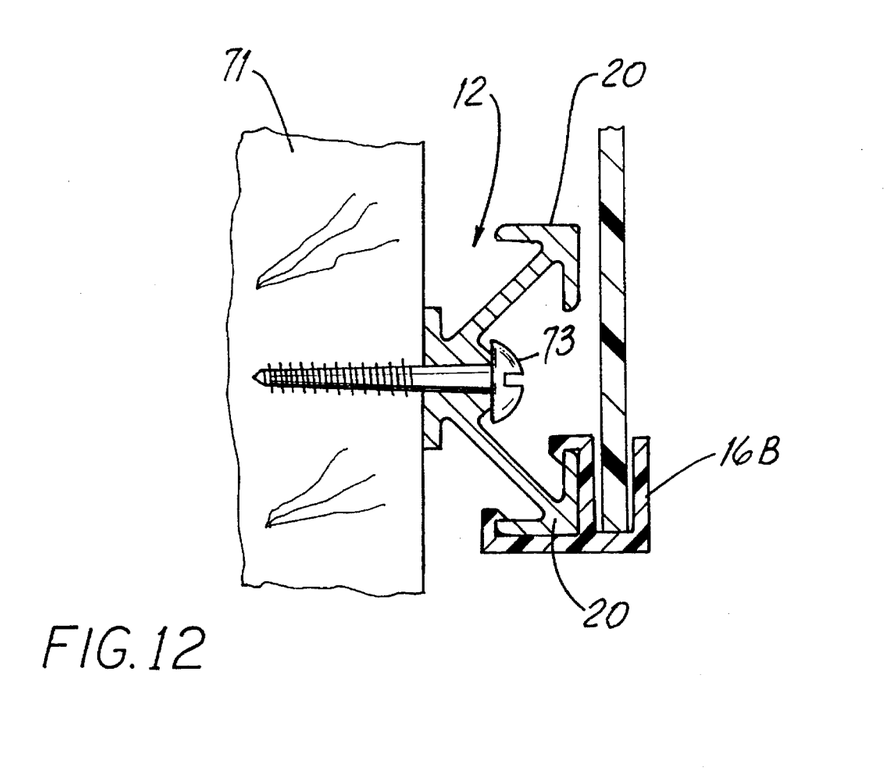
FIG. 12 is a cross-sectional view of another embodiment of a frame member shown in conjunction with corner channels and a surface to which the assembly is attached.

FIGS. 11 and 12 illustrate ways in which the frame apparatus of this invention, particularly frame members 12 thereof, are mounted to a wall 71 by one or more screws 73 through center structure 21. Frame member 12 of FIG. 12 is of a somewhat different form than has heretofore been described, having but two arm structures 20, spaced 90° from one another. The embodiments of FIGS. 11 and 12 are shown with channel members 16B, similar to members 16B earlier mentioned.

While the frame apparatus of the invention can be mounted as depicted in FIGS. 11 and 12, the apparatus of this invention 10 can be independently supported, as from above, or even free-standing. An almost endless variety of construction and mounting configurations are possible with the apparatus of this invention. It will be appreciated that the apparatus of this invention is a highly versatile, highly adaptable, and easy-to-use display system. And the aesthetic appearance of the system of this invention can easily be customized to suit a nearly infinite variety of application requirements and signage or display color schemes.

While the principles of this invention have been described in connection with specific embodiments, it should be understood clearly that these descriptions are made only by way of example and are not intended to limit the scope of the invention.

I claim:

1. In an apparatus for mounting a display panel and including a frame member and a frame connector having a fastener, the frame member having (a) a plurality of arm structures extending outwardly from a frame axis, and (b) a fastener bearing surface between a pair of arm structures, the improvement wherein:

the connector comprises a center portion and a pair of wing-like compression members extending from the center portion at an angle of greater than 90° and less than 180°; and the fastener bearing surface includes a pair of spaced elongate rails between the pair of arm structures, whereby the fastener bears against the rails and urges the connector against the pair of arm structures.

2. The apparatus of claim 1 wherein:

the pair of arm structures defines an angle therebetween; and a plane coincident with the rails is substantially perpendicular to a line bisecting the angle.

3. The apparatus of claim 2 wherein each elongate rail has a substantially flat surface and the flat surfaces are coplanar.

4. The apparatus of claim 1 wherein each of the pair of arm structures has:

a distal edge; and a strip extending along the distal edge; and wherein:

the rails have a groove therebetween;

the strips have a gap therebetween; and the groove is in registry with the gap.

5. The apparatus of claim 4 wherein:

the pair of arm structures define an angle therebetween; and a plane bisecting the angle also bisects the gap and the groove.

6. The apparatus of claim 4 wherein the gap and the groove each have a width and the width of the gap is substantially greater than the width of the groove.

7. The apparatus of claim 1 wherein:

the frame member has four arm structures; and each pair of arm structures has a pair of rails therebetween.

8. The apparatus of claim 7 wherein at least one of the pair of rails between a pair of arm structures has a substantially flat surface.

9. The apparatus of claim 1 including a colored channel member engaging at least one arm structure.

10. The apparatus of claim 9 wherein the channel member includes a slot for receiving a display panel.

11. In an apparatus for mounting a display panel and including a frame member and a frame connector, the frame member having a plurality of arm structures extending outwardly from a frame axis, and wherein each arm structure has a strip, the improvement wherein:

the connector comprises a center portion and a pair of wing-like compression members extending from the center portion at an angle greater than 90° and less than 180°; and each of the pair of compression members bears against a strip of each of two arm structures.

12. The apparatus of claim 11 wherein:

at least one arm structure and a strip define a V-channel;

at least one compression member has an edge; and the compression member edge substantially fits into the V-channel.

13. The apparatus of claim 11 wherein at least one compression member includes a notch formed therein.

14. The apparatus of claim 13 wherein:

each compression member includes a pair of laterally disposed notches formed therein;

the apparatus has a pair of abutting frame members angular to one another; and a strip of a separate arm structure is received in each notch.

15. The apparatus of claim 14 wherein:

each connector includes a long axis;

each compression member has an end;

the ends are angled with respect to the long axis of the connector; and each compression member end bears against a separate adjacent arm structure.

16. The apparatus of claim 11 wherein each of the wing-like compression members is at about a 135° angle to the connector center portion.

17. The apparatus of claim 11 wherein the connector center portion has a narrow substantially flat central region devoid of compression members.

18. The apparatus of claim 11 including a colored channel member engaging at least one arm structure.

19. In a frame apparatus for mounting a display panel having an outside and including a frame member and a frame connector, the frame member having a plurality of arm structures extending outwardly from a frame axis and forming a space therebetween, the improvement wherein:

the frame member has a center structure adjacent to the space and from which the arm structures extend;

the connector is bent to form an angle of about 90° and has two portions, one portion on each side of such bend, at least one of the portions having an elongate aperture therethrough;

a bolt extending through the center structure and the elongate aperture and having a turn-engageable end exposed to the outside of the frame apparatus, and having on its threaded portion:

a trapped threaded member rotationally restrained within the space between the arm structures; and a fixed member at an end opposite the turn-engageable end of the bolt, the threaded length of the bolt between the fixed member and the turn-engageable end being more than the combined dimensions of the frame member center structure and the thickness of the connector;

whereby bolt turning loosens and tightens the attachment of the frame member and the connector;

thereby allowing sliding expansion of the frame apparatus to facilitate display panel replacement.

20. The apparatus of claim 19 wherein the channel member includes a slot for receiving a display panel.

21. In an apparatus for mounting a display panel and including a frame member and a frame connector having a fastener, the frame member having (a) a plurality of arm structures extending outwardly from a frame axis, and (b) a fastener bearing surface between a pair of arm structures, the improvement wherein:

the fastener bearing surface includes a pair of spaced elongate rails between the pair of arm structures;

each of the pair of arm structures has a distal edge and a strip extending along the distal edge;

and wherein:

the rails have a groove therebetween;

the strips have a gap therebetween;

the groove is in registry with the gap;

the gap and the groove each have a width; and the width of the gap is substantially greater than the width of the groove, whereby the fastener bears against the rails and urges the connector against the pair of arm structures.

22. In an apparatus for mounting a display panel and including a frame member and a frame connector, the frame member having a plurality of arm structures extending outwardly from a frame axis, and wherein each arm structure has a strip, the improvement wherein:

the connector comprises a center portion and a pair of wing-like compression members extending angularly from the center portion;

each of the pair of compression members bears against a strip of each of two arm structures;

each compression member includes a pair of laterally disposed notches formed therein;

the apparatus has a pair of abutting frame members angular to one another; and a strip of a separate arm structure is received in each notch.

23. The apparatus of claim 22 wherein:

each connector includes a long axis;

each compression member has an end;

the ends are angled with respect to the long axis of the connector; and each compression member end bears against a separate adjacent arm structure.

* * * * *